Feb. 22, 1955
C. H. SPARKLIN
2,702,871
ELECTRIC MOTOR, INCLUDING AN IMPEDANCE
AND COOLING MEANS THEREFOR
Filed April 20, 1951
2 Sheets-Sheet 1
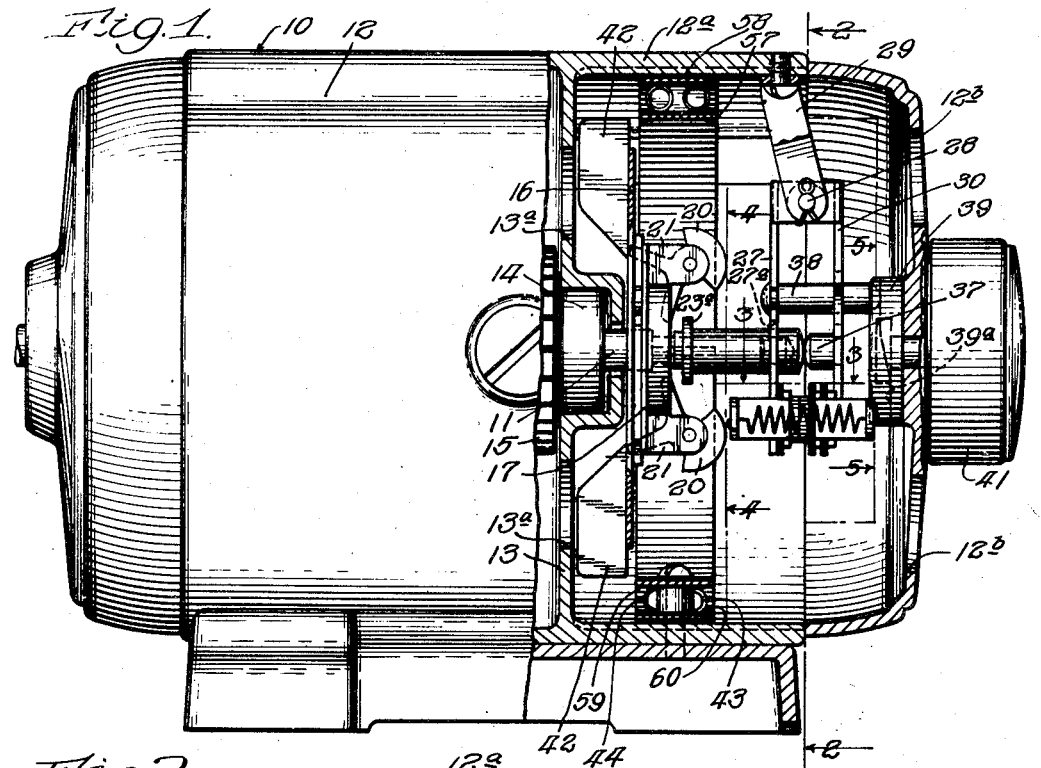
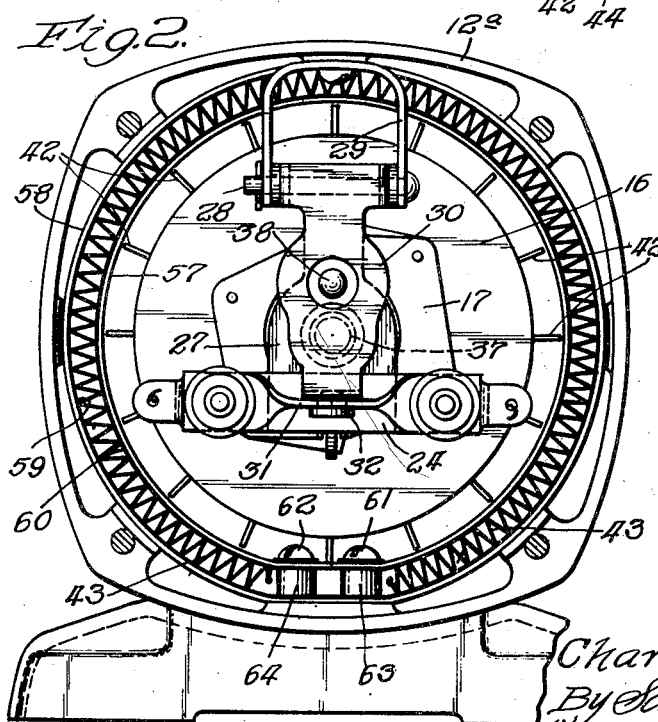
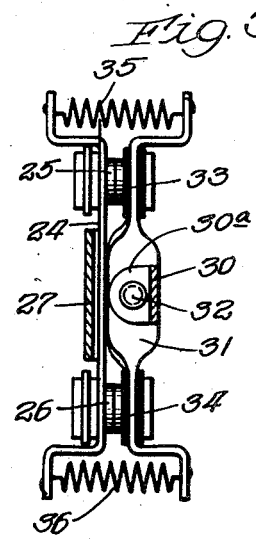
Inventor:
Charles H. Sparklin,
By Schroeder, Merriam,
Hofgren & Brady, Attys.

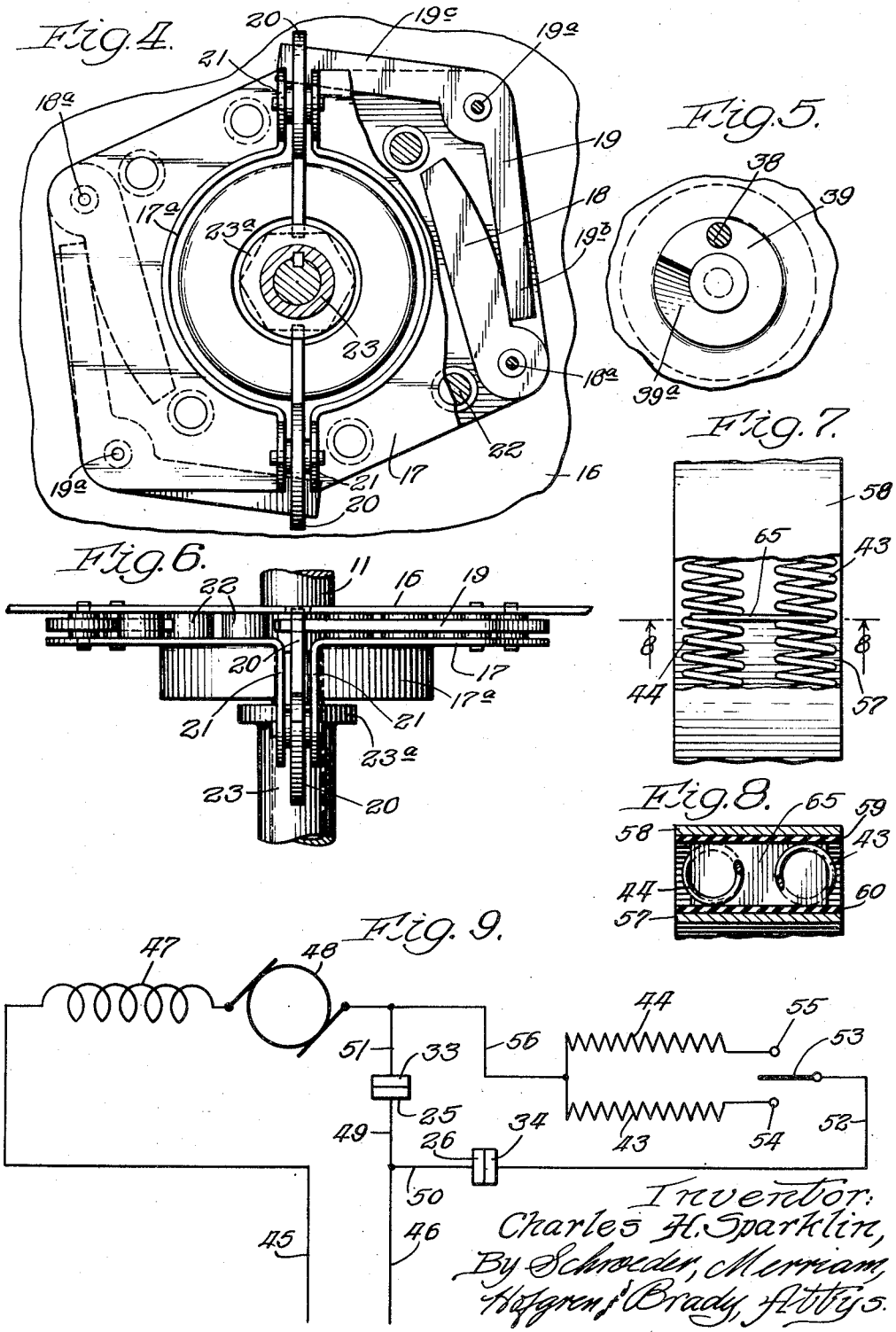

United States Patent Office 2,702,871
Patented Feb. 22, 1955

2,702,871

ELECTRIC MOTOR, INCLUDING AN IMPEDANCE AND COOLING MEANS THEREFOR

Charles H. Sparklin, Chicago, Ill., assignor to Birtman Electric Company, a corporation of Illinois Application April 20, 1951, Serial No. 221,980

4 Claims. (Cl. 310—72)

This invention relates to an electric motor including an impedance adapted to be placed in the motor circuit in controlling the speed of the motor and a cooling means for this impedance.

In my copending application Serial No. 792,084, filed December 16, 1947, I have disclosed and claimed an electric motor including an impedance adapted to be placed in the motor circuit in controlling the speed of the motor with this impedance being placed in the motor circuit on opening a pair of centrifugally operated contact points arranged to open at a predetermined speed. The motor includes a first pair of contact points arranged to open at a predetermined speed to place an impedance in the motor circuit as a "cushion" reducing the acceleration of the motor. There is also provided a second pair of contacts adapted to open at a higher speed to break the circuit at a predetermined speed higher than the first predetermined speed, thereby serving to control the maximum motor speed. This arrangement of two pairs of contact points and the impedance prevents irregular and jerky operation of the motor when it is running at a speed approximating its maximum speed.

As the impedance is in the motor circuit for a substantial portion of the time with electric current flowing therethrough, relatively large quantities of heat are generated. This heat must be dissipated for efficient operation of the motor. Furthermore, the impedance must be so located within the motor that it does not interfere with the operating parts of the motor and does not increase the bulk of the motor. In the present invention I have solved these problems by locating the impedance within the casing and preferably around an inner surface thereof and cooling the impedance by providing means concentrating the air flow adjacent the exhaust of a rotatable cooling fan and locating the impedance at this point of concentration.

The invention will be described as related to the embodiment shown in the accompanying drawings. Of the drawings: Fig. 1 is a side elevation partially in vertical section of an electric motor embodying the invention; Fig. 2 is a vertical section taken substantially along line 2—2 of Fig. 1; Fig. 3 is a section taken substantially along line 3—3 of Fig. 1; Fig. 4 is a section taken substantially along line 4—4 of Fig. 1; Fig. 5 is a section taken substantially along line 5—5 of Fig. 1; Fig. 6 is an end elevation of the speed control mechanism of Fig. 4; Fig. 7 is a fragmentary plan view partially broken away of the impedance of the motor of Fig. 1 and the mounting frame for this impedance; Fig. 8 is a section taken substantially along line 8—8 of Fig. 7; and Fig. 9 is a diagrammatic view illustrating one embodiment of the electrical circuit of the motor.

Although the motor disclosed in the drawings and described herein is one wherein the operation is governed by a pair of contact points in combination with an impedance, it is obvious that the principles of the invention are applicable to any motor wherein an impedance, such as a resistor, is employed in the motor circuit for controlling speed or other purposes. Irrespective of the operation of the impedance and the construction of the motor, the problems of locating the impedance within the motor and cooling the impedance are encountered. This invention successfully solves these problems.

The motor 10 of the accompanying drawings comprises a shaft 11 and a casing 12. The motor shaft 11 extends through an end wall 13 of the motor casing and is supported therein by a bearing 14. The motor shaft 11 extends through this wall 13 into a compartment formed by a casing section 12a housing the speed governor portion of the apparatus.

The speed governor comprises a relatively large flat plate 16 mounted on the shaft 11 and arranged at substantially right angles thereto, a second smaller plate 17 also fastened on the shaft 11 and parallel to and closely adjacent the first plate 16, and a pair of centrifugally responsive arms 18 mounted between the plates 16 and 17 on opposite sides thereof, with each arm rotatable about a fulcrum 18a at one end thereof so as to be forced outwardly by centrifugal force. There is also provided a pair of first bell cranks 19 also mounted between plates 16 and 17 with each being rotatable about a fulcrum 19a and each being rotated by movement of an arm 18. A pair of second bell cranks 20 are mounted on the smaller plate 17 at substantially right angles thereto.

The arms 18 are mounted substantially diametrically opposite each other and each arm is adapted to contact one end 19b of one of the first bell cranks 19. The other end of each bell crank extends to a position at least partially between the plates 16 and 17. Each of the second bell cranks 20 is mounted between upstanding portions 21 provided on the plate 17 and one end of each second bell crank is adapted to be located adjacent to and to be contacted by the inside surface of the end 19c of one of the first bell cranks 19. The other end of the second bell crank 20 extends toward the shaft 11. The plate 17 is provided with a substantially annular upstanding inner rim 17a that is concentric with the shaft 11 and serves to reinforce the plate 17. The two plates 16 and 17 are held in spaced apart relationship by means of posts 22 extending between the two plates.

A thimble 23 is slidably mounted on the end of the shaft 11 and keyed thereto so as to rotate with the shaft. The inner end of the thimble 23 is provided with an annular rim portion 23a that is adapted to be contacted at the inner ends of the second bell cranks 20.

When the motor is in operation the increasing speed of the motor tends to force the arms 18 outwardly due to centrifugal forces set up in these arms. This outward movement causes rotation of the first bell cranks 19 which in turn causes rotation of the second bell cranks 20, thereby moving the inner ends of the second bell cranks 20 outwardly against the thimble 23. The outward movement of the thimble 23 serves to open the motor circuit and control the speed thereof.

The above described speed governor construction is described and claimed in my prior Patent No. 2,532,345, issued December 5, 1950.

In order to control the speed of the motor, there is provided a contact arm 24 having two spaced apart contact points 25 and 26 mounted thereon in spaced apart relationship and insulated from the arm. This contact arm 24 is mounted on one end of a base member 27 with the other end rotatably mounted about a pin 28 held by a bracket 29. Also rotatable about the pin 28 is a second arm 30 extending downwardly to a point opposite the middle of the first arm 24. The lower end 30a of this second arm is turned inwardly and has a third arm 31 rotatably mounted thereon by a pivot 32. The ends of the arm 31 are twisted substantially 90° so that these ends are parallel to the first arm 24. These parallel ends are provided with two contact points 33 and 34 mounted thereon and insulated therefrom. One point 33 is arranged to contact one point 25 on the first arm 24 and the other point 34 is similarly arranged to contact the other point 26 on the first arm.

The extreme ends of the first arm 24 and second arm 31 are spaced from each other. The ends which are adjacent the one pair of contacts 25 and 33 are provided with a coil spring 35. The other pair of contacts 26 and 34 are provided with a similar spring 36 of slightly greater strength.

The thimble 23 is arranged to extend through an opening 27a and the base member 27 and contact a button 37 mounted on the second arm 30. In order to vary the position of the pairs of contact points relative to the end of the shaft in changing the maximum speed of the motor, there is provided a post 38 mounted on the base member 27 and extending through an opening in the second arm 30. The outer end of this post is adapted to bear against a rotatable cam member 39 having a substantially circular cam surface 39a thereon. The cam member 39 is rotated by a control knob 41 positioned outside the casing 12.

The above described arrangement of regulating means including the two pairs of contacts and springs 35 and 36 are described and claimed in my above mentioned copending application 792,084.

In order to provide for ventilation of the motor, spaced openings 13a are arranged in the wall 13 that is adjacent the commutator 15. Additional openings 12b are also provided at the ends of the motor casing. In order to provide a circulation of air, spaced radial fan blades 42 are provided around the rotatable plate 16 and extending beyond this plate.

In order to cushion the acceleration or deceleration of the motor and to reduce jerky operation when operating near the maximum predetermined speed there are provided a pair of resistance wire coils 43 and 44 adapted to be placed in the motor circuit as shown in Fig. 9. Coil 43 is used as an idle coil and has a higher resistance than coil 44 which is employed when the motor is operating under load conditions. As shown in Fig. 9, one lead 45 is adapted to be connected to a source of electric current such as 110 volt, 60 cycle alternating current. The other lead wire 46 is adapted to be connected to the other side of the source of electric current. Lead 45, in the embodiment shown, is connected to one side of the field coil 47. The other side of this field is connected to the armature 48. The lead 46 is connected through wires 49 and 50 to contact points 25 and 26 of the two pairs of contact points. The other contact point 33 of the pair of points 25 and 33 is connected through wire 51 to the side of the armature 48 opposite the field coil 47. The contact point 34 of the pair of contact points 26 and 34 is connected through wire 52 to a movable switch 53 which is used to place either impedance 43 or 44 in the electrical circuit by closing the circuit through a contact 54 or a contact 55 respectively. The opposite ends of the impedances 43 and 44 are connected through a wire 56 to contact point 33 and the adjacent side of the armature 48. This arrangement of contact points and impedance is of the general type disclosed and claimed in my above mentioned copending application 792,084.

When the motor is idling under no load or light load conditions, the switch 53 is turned to engage point 54 to complete the circuit through impedance 43. As this impedance has a relatively high resistance, acceleration and deceleration will be reduced adjacent the maximum speed of the motor so that jerky operation will be eliminated or considerably minimized. When the motor is thus operating under idling conditions, contacts 25 and 33, which are provided with light spring 35, will open first and thus place impedance 43 in the circuit as this impedance is shorted out when contacts 25 and 33 are closed. This impedance serves to reduce the acceleration of the motor. As soon as the speed of the motor has reached a higher value, contact points 26 and 34 will control the operation of the motor. When the motor is operated under load conditions, switch 53 is turned to contact 55 to close the circuit through impedance 44 which has a relatively light resistance. This relatively light resistance is sufficient as the load itself tends to brake the acceleration of the motor. When the speed of the motor has reached a predetermined value, contacts 25 and 33, which have shorted out the impedance, open and place the impedance in the circuit. If the load is such that further acceleration occurs, contacts 26 and 34 then open to break the circuit through the motor. The speed of the motor immediately drops and contacts 26 and 34 close. If the motor load is extremely heavy, the speed will further decrease until contacts 25 and 33 close thereby placing the full current through the motor. When the switch 53 is in the open position, as shown in Fig. 9, the motor operates as a single contact governed motor with contacts 25 and 33 alone controlling the speed. This is the arrangement described and claimed in my above mentioned Patent 2,532,345.

Although under idling conditions impedance 43 is used and under load conditions impedance 44 is used when the motor is operating in the preferred manner, the motor will have the same efficiency if operated through one impedance only under all conditions of load. Similarly, the motor will operate with the same efficiency even when neither impedance 43 or 44 is in the circuit. However, for quieter and smoother operation with a material reduction or complete elimination of noise, vibration and bumping, the preferred operation is as described above. Attention is directed to my copending application 792,084 for a more detailed description of the operation of such a motor.

When an impedance such as described is used in a motor circuit whether for the purpose described herein or for any other purpose, considerable problems of locating the impedance so as to occupy a minimum of space and cooling the impedance are encountered. The present invention is concerned with the solutions of these two problems. In the embodiment shown, the impedances 43 and 44 are in the form of helical coils of resistance wire and are positioned adjacent the peripheral path of the fan blades 42. As the fan blades 42 extend to points short of the casing 12a and are located adjacent the openings 13a, these fan blades draw air through the openings 13a and force it outwardly against the adjacent portions of the casing so that these portions serve to concentrate the air flow adjacent the exit to the fan. The impedances are located at this point of concentrated air flow as shown in Figs. 1 and 2. In the embodiment shown, impedances or resistance coils 43 and 44 are arranged parallel to each other and spaced apart in a helical path. They are held between two concentric short cylinders 57 and 58 with these coils extending around the innermost cylinder 57 and insulated therefrom by an insulating strip 59 of mica, asbestos or any similar suitable material. These resistance coils bear against a second strip of insulating material 60 located on the inner surface of the outer cylinder 58. These cylinders and the associated insulating strips 59 and 60 and impedance resistance coils 43 and 44 are held in assembled relationship by a pair of screws 61 and 62 extending through the cylinders and engaging the bottom of the motor casing. The two cylinders are held in spaced apart relationship by means of collars 63 and 64 extending between the cylinders and through which the screws pass.

In order to prevent the resistance coils 43 and 44 from shifting toward each other and contacting, a plurality of narrow spacers 65 are employed. These spacers, which may be of any suitable insulating material such as mica, asbestos or the like, are of substantially rectangular shape and have their top and bottom edges contacting insulating strips 59 and 60 and their side edges bearing against the inner surfaces of the outer portions of resistance coils 43 and 44 to hold them in spaced apart relationship in the manner shown most clearly in Figs. 7 and 8. A plurality of spacers are provided to hold all portions of the resistance coils in spaced apart relationship. As the spacers 65 are very thin and present their end edges to the air flow from the fan the resistance to the flow is very small so that air may flow outwardly from the fan and rearwardly along the inner surface of casing 12a and between the cylinders 57 and 58 and over the coils 43 and 44 to cool these coils.

The resistance, amperage and length of each impedance coil 43 and 44 will depend on the size of the motor, the current and other variables. These variables are well understood by those skilled in the art so that suitable coils may be easily designed for any particular set of conditions. In one embodiment of the invention where a relatively light motor was used on 110 volt, 60 cycle alternating current, the idling coil 43 had a resistance of 40 ohms at 2 amperes. No. 29 Nichrome V wire of 0.0113" diameter was used. Each coil had a diameter of 0.1875" and extended 5.4" with 0.025" spacing between adjacent coils. A total of 150 turns was employed and the total length was 88.5". The load coil 44 had a 10 ohm resistance at 5 amperes and was made of 88.5" of No. 23 Nichrome V wire of 0.0226" diameter. The diameter of each coil was 0.1875" and 150 turns were used with the spacing between each pair of adjacent coils being 0.0226".

Having described my invention as related to the embodiment shown in the accompanying drawings, it is my intention that the invention be not limited by any of the details of description unless otherwise specified but rather be construed broadly within its spirit and scope as set out in the accompanying claims.

I claim:

1. In an electric motor including a casing having ventilating openings therein, ventilating apparatus comprising a rotatable fan including a plurality of blades each terminating short of an inner surface of the casing, a transverse member extending to said inner surface located closely adjacent to one side of the fan and having air openings therein, the transverse member and adjacent casing surface thereby serving to direct air in a rapidly flowing stream from the fan outwardly to said inner surface and then along said surface, and an open air-permeable electric impedance closely adjacent to said inner surface and to the other side of said fan through which said air stream flows.

2. The apparatus of claim 1 wherein said impedance comprises an open wire helix positioned adjacent to said casing inner surface and located beyond the periphery of said fan.

3. In an electric motor including a casing having ventilating openings therein, ventilating apparatus comprising a rotatable fan including a plurality of blades each terminating short of an inner surface of the casing, a transverse member extending to said inner surface located closely adjacent to one side of the fan and having air openings therein, the transverse member and adjacent casing surface thereby serving to direct air in a rapidly flowing stream from the fan outwardly to said inner surface and then along said surface, an arcuate frame member adjacent to the periphery of the fan having one surface spaced from said casing inner surface so that the fan air stream flows between the frame member and casing surface, and an open air-permeable electric impedance between the frame member and casing surface through which said air stream flows.

4. In an electric motor including a casing having ventilating openings therein, ventilating apparatus comprising a rotatable fan including a plurality of blades each terminating short of an inner arcuate surface in the casing to direct a stream of air therealong, and an open, arcuate, air-permeable electric impedance closely adjacent to said inner surface and to the outer ends of the rotating blades through which said air stream flows to cool the impedance, said impedance including a pair of resistance wire helices arranged in substantially parallel planes within the annular space between a pair of spaced concentric cylinders, one inside the other, the planes of the helices being arranged substantially parallel to the plane of rotation of the fan.

References Cited in the file of this patent

UNITED STATES PATENTS

| | | |
|---|---|---|
| 682,323 | Erie | Sept. 10, 1901 |
| 1,587,760 | Connell | June 8, 1926 |
| 2,017,255 | Norton | Oct. 15, 1935 |
| 2,064,388 | Smellie | Dec. 15, 1936 |
| 2,182,083 | Jepson | Dec. 5, 1939 |
| 2,240,664 | Moore | May 6, 1941 |
| 2,391,964 | Green | Jan. 1, 1946 |
| 2,432,067 | Morse | Dec. 2, 1947 |
| 2,512,902 | Willits | June 27, 1950 |
| 2,521,654 | Sandler | Sept. 5, 1950 |

FOREIGN PATENTS

| | | |
|---|---|---|
| 676,838 | France | Nov. 29, 1929 |
| 918,519 | France | Oct. 28, 1946 |